United States Patent
Merchant et al.

(10) Patent No.: US 11,442,937 B2
(45) Date of Patent: Sep. 13, 2022

(54) OPTIMAL ADMISSION CONTROL FOR CACHES

(71) Applicant: Google LLC, Mountain View, CA (US)

(72) Inventors: Arif Merchant, Los Altos, CA (US); Tzu-Wei Yang, Sunnyvale, CA (US); Mustafa Uysal, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 55 days.

(21) Appl. No.: 16/899,180

(22) Filed: Jun. 11, 2020

(65) Prior Publication Data

US 2021/0390104 A1   Dec. 16, 2021

(51) Int. Cl.
| | |
|---|---|
| *G06F 16/2455* | (2019.01) |
| *G06F 16/2453* | (2019.01) |
| *G06F 16/22* | (2019.01) |
| *G06F 12/02* | (2006.01) |
| *G06F 9/30* | (2018.01) |
| *G06F 12/0813* | (2016.01) |

(52) U.S. Cl.
CPC .... *G06F 16/24552* (2019.01); *G06F 9/30047* (2013.01); *G06F 12/0246* (2013.01); *G06F 12/0813* (2013.01); *G06F 16/2282* (2019.01); *G06F 16/24539* (2019.01)

(58) Field of Classification Search
None
See application file for complete search history.

(56) References Cited

U.S. PATENT DOCUMENTS

| | | | |
|---|---|---|---|
| 7,051,161 B2 | 5/2006 | Dixit et al. | |
| 2008/0279200 A1* | 11/2008 | Shatzkamer | H04L 63/102 370/401 |
| 2014/0280679 A1* | 9/2014 | Dey | H04L 67/322 709/213 |
| 2015/0193144 A1 | 7/2015 | Bilas et al. | |
| 2016/0335177 A1* | 11/2016 | Huang | G06F 12/0864 |
| 2017/0083474 A1* | 3/2017 | Meswani | G06F 12/0862 |
| 2020/0073825 A1 | 3/2020 | Zaydman | |

(Continued)

OTHER PUBLICATIONS

Kirilin et al. RL-Cache: Learning-Based Cache Admission for Content Delivery. Jun. 5, 2020. IEEE Journal on Selected Areas in Communications, vol. 38(10), pp. 2372-2385, DOI: 10.1109/JSAC.2020.3000415 Retrieved from the Internet: <https://ieeexplore.ieee.org/stampPDF/g etPDF.jsp?tp=&arnumber=91093398ref=aHROcHM6Ly9pZWV1eHBsb3J1Lm11ZWUub3JnL2RvY3VtZW50LzkxMDkzMzk=>.

(Continued)

*Primary Examiner* — Robert W Beausoliel, Jr.
*Assistant Examiner* — Cheryl M Shechtman
(74) *Attorney, Agent, or Firm* — Lerner, David, Littenberg, Krumholz & Mentlik, LLP

(57) ABSTRACT

The technology is directed to cache admission control. One or more processors may categorize access requests for data items in a cache storage into a plurality of categories and collect information on the access requests over time. Based on the collected information, a utility value for caching data items in each category of the plurality of categories may be determined. Newly requested data items may be admitted into the cache storage in an order according to the corresponding utility values of their respective categories.

17 Claims, 5 Drawing Sheets

(56) References Cited

U.S. PATENT DOCUMENTS

2020/0174842 A1  6/2020  Wang et al.
2020/0192899 A1* 6/2020  Joshi ................. G06F 16/24552

OTHER PUBLICATIONS

Kirilin et al. RL-Cache: Learning-Based Cache Admission for Content Delivery. Jun. 5, 2020. IEEE Journals & Magazine, IEEE Xplore, pp. 1-23. Retrieved from the Internet: <https://ieeexplore.IEEE.org/abstract/document/9109339>.

Mertz and Nunes. Understanding Application-Level Caching in Web Applications: A Comprehensive Introduction and Survey of State-of-the-Art Approaches. Nov. 22, 2017. ACM Computing Surveys, ACM, New York, NY, US, vol. 50(6), pp. 1-34, DOI: 10.1145/3145813.

Extended European Search Report for European Patent Application No. 20207364.9 dated May 11, 2021. 9 pages.

Huang, Sai et al. "Improving Flash-based Disk Cache with Lazy Adaptive Replacement." 2013 IEEE 29th Symposium on Mass Storage Systems and Technologies (MSST), Long Beach, CA, 2013, pp. 1-10.

Kang, Sooyong and Heon Y. Yeom. "Statistical Admission Control for Soft Real-Time VOD Servers." Proceedings of the 2000 ACM Symposium on Applied Computing, SAC '2000, published in 2000, Como, Italy, pp. 579-584.

\* cited by examiner

OPTIMAL ADMISSION CONTROL FOR CACHES

BACKGROUND

A cache is commonly provided in systems to store data items for access at a lower "cost" than if the cache were not present. For example, a system may be structured such that processors or other components can obtain data stored in one memory faster than other memories. This faster memory may be used as a cache and frequently-accessed items of information contained in the other memories may be copied into and accessed from the cache. The cache may provide faster access to the data items than if the data items were accessed from the other, slower memories. Caches are often too small to store all data items. Accordingly, cache-based systems typically need to be selective when it comes to determining which items of information will be stored in the cache.

Typically, a cache admits data items that have been accessed to speed up later accesses. Over time, the cache retains the data items that continue to be accessed while the data items that are not being accessed are evicted to make room for more commonly accessed data items. However, even if not all the admitted data items are retained, the initial admission of the data items still uses up space in the cache, and in cases such as flash-based cache systems, writing the data items into the cache also incurs costs. Thus, it may be preferable to not admit certain data items into the cache in the first place. For example, a Lazy Adaptive Replace Cache (LARC) does not admit data items on the first access, but rather on the second access of the data items. Since most data items that are repeatedly accessed will be accessed more than two times, LARC eliminates the data items that are only accessed one time from being admitted into the cache. However, LARC misses the opportunity to cache data items at the first access, and thus cannot provide time-saving for the second access of the data items.

BRIEF SUMMARY

The technology relates generally to cache admission control. According to one aspect, a method for cache admission control includes one or more processors that categorize access requests for data items in a cache storage into a plurality of categories; collect information on the access requests over time; determine, based on the collected information, a utility value for each category of the plurality of categories; identify a set of categories from the plurality of categories based on the determined utility values of each category; receive an access request for a new data item; determine a category associated with the access request for the new data item; and admit the new data item into the cache storage when the category associated with the access request for the new data item matches at least one of the categories in the set of categories.

In some instances, the plurality of categories are determined based on at least one of: user accounts of a service and tables of a distributed database.

In some aspects, the information is collected over a historical time period. In some examples, the information is collected in real-time over a predetermined moving window. In some examples, the information collected may include at least one of: whether access requests have been received for data items in each category before eviction, number of times data items from each category has been accessed before eviction.

In some aspects, data items are stored as blocks in the cache storage and the information on access requests are collected for each block. In some examples, data items in each category are stored in multiple blocks, and the utility value for each category is determined by summing respective utility values of the multiple blocks.

In some aspects, the utility value is determined by one or more of: disk access time savings, written bytes to flash, and cache byte-time used. In some examples, the utility value is determined over a plurality of cache retention times.

In some aspects, the newly requested data items are admitted into the cache storage in a descending order according to their respective utility values until the cache storage is full or when a next category provides a negative utility value.

Another aspect of the disclosure is directed to a system comprising one or more processors configured to: categorize access requests for data items in a cache storage into a plurality of categories; collect information on the access requests over time; determine, based on the collected information, a utility value for each category of the plurality of categories; identify a set of categories from the plurality of categories based on the determined utility values of each category; receive an access request for a new data item; determine a category associated with the access request for the new data item; and admit the new data item into the cache storage when the category associated with the access request for the new data item matches at least one of the categories in the set of categories.

In some aspects, the system includes one or more storage devices configured to store the data items in the cache storage. In some examples, the one or more processors are on the storage devices.

In some aspects, the system includes one or more client devices configured to access the data items in the cache storage. In some examples, the one or more processors are on the client devices.

Another aspect of the disclosure is directed to a non-transitory computer-readable storage medium storing instructions executable by one or more processors for performing a method, comprising: categorizing access requests for data items in a cache storage into a plurality of categories; collecting information on the access requests over time; determining, based on the collected information, a utility value for each category of the plurality of categories; identifying a set of categories from the plurality of categories based on the determined utility values of each category; receiving an access request for a new data item; determining a category associated with the access request for the new data item; and admitting the new data item into the cache storage when the category associated with the access request for the new data item matches at least one of the categories in the set of categories.

In some examples, the plurality of categories are determined based on at least one of: user accounts of a service and tables of a distributed database.

In some examples, the information is collected over a historical time period. In some examples, the information is collected in real-time over a predetermined moving window. In some examples, the information collected may include at least one of: whether access requests have been received for data items in each category before eviction, number of times data items from each category has been accessed before eviction.

DETAILED DESCRIPTION

The technology relates generally to cache admission control. To address the issues discussed above, a method is provided for optimizing cache admission control. In this regard, access requests for data items are divided into a plurality of categories and information on the access requests for data items are collected over a period of time. Based on the information, a utility for caching data items in each category of the plurality of categories is determined. As such, when access requests for new data items are received, the newly requested data items are admitted in an order according to the corresponding utility of their respective categories.

Example System

Figure 1:
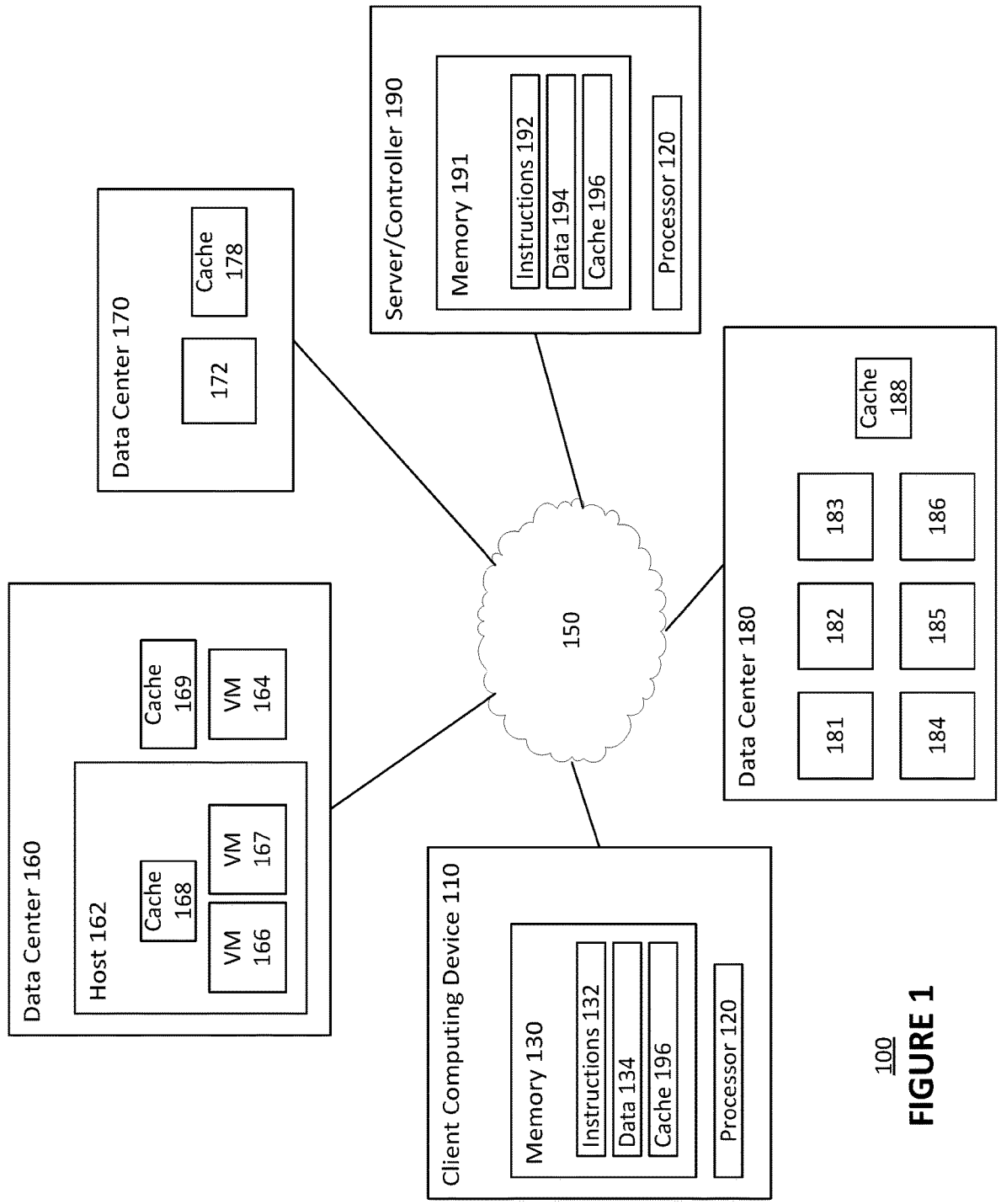
FIG. 1 is a functional diagram of a distributed computing system in accordance with aspects of the disclosure.

FIG. 1 illustrates an example system 100 including a distributed computing system. A plurality of data centers 160, 170, 180 may be communicatively coupled, for example, over a network 150. The data centers 160, 170, 180 may further communicate with one or more client devices, such as client computing device 110, over the network 150. Thus, for example, the client computing device 110 may execute operations in "the cloud." In some examples, the data centers 160, 170, 180 may further communicate with a server/controller 190.

Each client computing device 110 may be a personal computer, intended for use by a person having all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by processor 120, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client computing device 110 may contain a processor 120, memory 130, and other components typically present in general purpose computers. The memory 130 can store information accessible by the processor 120, including instructions 132 that can be executed by the processor 120. Memory 130 can also include data 134 that can be retrieved, manipulated or stored by the processor 120. The memory 130 may be a type of non-transitory computer readable medium capable of storing information accessible by the processor 120, such as a hard-drive, solid state drive, flash drive, tape drive, optical storage, memory card, ROM, RAM, DVD, CD-ROM, write-capable, and read-only memories. The processor 120 can be a well-known processor or other lesser-known types of processors. Alternatively, the processor 120 can be a dedicated controller such as an ASIC.

The instructions 132 can be a set of instructions executed directly, such as machine code, or indirectly, such as scripts, by the processor 120. In this regard, the terms "instructions," "steps" and "programs" can be used interchangeably herein. The instructions 132 can be stored in object code format for direct processing by the processor 120, or other types of computer language including scripts or collections of independent source code modules that are interpreted on demand or compiled in advance.

The data 134 can be retrieved, stored or modified by the processor 120 in accordance with the instructions 132. For instance, although the system and method is not limited by a particular data structure, the data 134 can be stored in computer registers, in a distributed storage system as a structure having a plurality of different fields and records, or documents, or buffers. The data 134 can also be formatted in a computer-readable format such as, but not limited to, binary values, ASCII or Unicode. Moreover, the data 134 can include information sufficient to identify relevant information, such as numbers, descriptive text, proprietary codes, pointers, references to data stored in other memories, including other network locations, or information that is used by a function to calculate relevant data.

The memory 130 may further include a cache 196. The cache may store data items, such as data 134, that may be required for future use. For example, the cache may be a storage device capable of quickly providing data items, such as flash based storage. The cache 196 may be located closer to the processor than other memory 130 to further reduce the time required for the cache to provide data items. Although the cache 196 is shown as being in the same housing as processor 120, such as a flash drive physically located within the same housing as processor 120, the cache 140 may also be in another location that results in more latency than retrieving data items from other portions of memory 130, but less latency than obtaining the information from other computing devices, such as server 190 or data centers 160, 170, 180.

Although FIG. 1 functionally illustrates the processor 120 and memory 130 as being within the same block, the processor 120 and memory 130 may actually include multiple processors and memories that may or may not be stored within the same physical housing. For example, some of the instructions 132 and data 134 can be stored on a removable CD-ROM and others within a read-only computer chip. Some or all of the instructions and data can be stored in a location physically remote from, yet still accessible by, the processor 120. Similarly, the processor 120 can actually include a collection of processors, which may or may not operate in parallel. Each processor may have its own cache or share a cache.

The data centers 160, 170, 180 may be positioned a considerable distance from one another. For example, the data centers may be positioned in various countries around the world. Each data center 160, 170, 180 may include one or more computing devices, such as processors, servers, shards, or the like. For example, as shown in FIG. 1, data center 160 includes computing devices 162, 164, data center 170 includes computing device 172, and data center 180 includes computing devices 181-186. According to some examples, the computing devices may include one or more virtual machines running on a host machine. For example, computing device 162 may be a host machine, supporting a plurality of virtual machines 166, 167 running an operating system and applications. While only a few virtual machines 166, 167 are illustrated in FIG. 1, it should be understood that any number of virtual machines may be supported by any number of host computing devices. Moreover, it should be understood that the configuration illustrated in FIG. 1 is merely an example, and that the computing devices in each of the example data centers 160, 170, 180 may have various structures and components that may be the same or different from one another.

Programs may be executed across these computing devices, for example, such that some operations are executed by one or more computing devices of a first data center while other operations are performed by one or more computing devices of a second data center. In some examples, the computing devices in the various data centers may have different capacities. For example, the different computing devices may have different processing speeds, workloads, etc. While only a few of these computing devices are shown, it should be understood that each data center 160, 170, 180 may include any number of computing devices, and that the number of computing devices in a first data center may differ from a number of computing devices in a second data center. Moreover, it should be understood that the number of computing devices in each data center 160, 170, 180 may vary over time, for example, as hardware is removed, replaced, upgraded, or expanded.

Moreover, various backend systems may be built upon the distributed storage system. For example, identity management systems, domain name server (DNS) setting management systems, etc. Such backend systems may to some extent be interrelated. For example, a user of the DNS setting management system may log in using an identification managed by the identity management system.

In some examples, each data center 160, 170, 180 may also include a number of storage devices (not shown), such as hard drives, flash drives, flash memory, random access memory, disks, disk arrays, tape drives, or any other types of storage devices. The data centers 160, 170, 180 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The data centers may include a number of other devices in addition to the storage devices, such as cabling, routers, etc. Further, in some examples the data centers 160, 170, 180 may be virtualized environments. Further, while only a few data centers 160, 170, 180 are shown, numerous data centers may be coupled over the network 150 and/or additional networks.

Each data center and/or host may include one or more caches. As further shown in FIG. 1, data center 160 may include cache 169, host 162 may include cache 168, data center 170 may include cache 178, server 190 may include cache 196, and data center 180 may include cache 188. Additionally, although FIG. 1 illustrates data center 180 as including only cache 188, each computing device 181-186 may also include and/or share a cache. In some instances, data centers, computing devices, and/or hosts may share caches. For instance, host 162 may not include a cache, such as cache 168, but may share cache 169 with data center 160.

In one example, the data centers, 160, 170, 180 and/or server 190 may use caches 169, 178, 188, and 196 to store data items that may be requested by the client devices, such as client computing device 110, and/or other data centers and/or servers. By doing such, the data centers 167, 170, 180, and/or server 190 may more quickly provide data items than if the data items were required to be retrieved from slower memory.

In some examples, the controller 190 may communicate with the computing devices in the data centers 160, 170, 180, and may facilitate the execution of programs. For example, the controller 190 may track the capacity, status, workload, or other information of each computing device, and use such information to assign tasks. The controller 190 may include a processor 120 and memory 191, including data 194 and instructions 192, similar to the client computing device 110 described above. The controller 190 may be configured to populate changes affecting authorization parameters to various components of the distributed storage system without shutting down service to users. For example, the controller 190 may have knowledge of an organizational structure, and do mappings to populate the changes affecting the authorization parameters throughout the organizational structure.

Client computing device 110, data centers 160, 170, 180, and controller 190 can be capable of direct and indirect communication such as over network 150. For example, using an Internet socket, a client computing device 110 can connect to a service operating on remote servers through an Internet protocol suite. Servers can set up listening sockets that may accept an initiating connection for sending and receiving information. The network 150, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Example Method

As explained herein, access requests for data items may be divided into a plurality of categories. Information on the access requests for data items may be collected over a period of time. Based on the information, a utility for caching data items in each category of the plurality of categories may be determined. Newly requested data items may be admitted into the cache in an order according to the corresponding utility of their respective categories. Admission of data items into the cache may be controlled by a cache admission control, such as one or more processors, such as processor 120 or one or more processors associated with or implemented in the cache.

Figure 2:
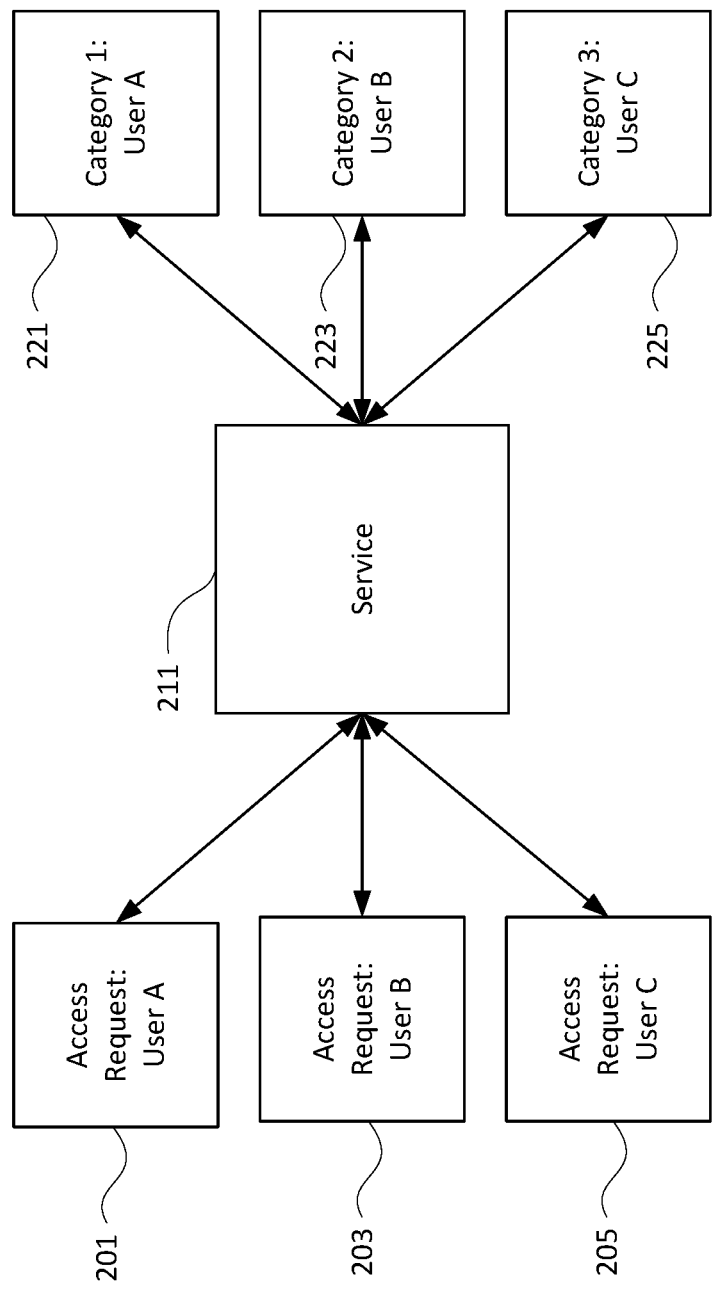
FIG. 2 is a flow chart illustrating the categorization of access requests by user in accordance with aspects of the disclosure.

The plurality of categories may be determined based on the types of workloads that make the access requests to the cache storage. The categories may be different user accounts. For instance, and as shown in FIG. 2, a server, such as server 190, may provide a service 211 to multiple user accounts A, B, and C. Access requests for user A 201, user B 203, and user C 205 for data items, workloads, etc., of the service may be received by the server 190. The server 190 may provide the requested items to the requesting user. Each request may be categorized or otherwise assigned into a respective category. For instance, requests from user A may be assigned to Category 1 221, requests from user B may be assigned to Category 2 223, and requests from user C may be assigned to Category 3 225. Although the foregoing example describes only three users and categories, any number of users and categories may be possible. Moreover, access requests from multiple users may be assigned to the same category. For instance, access requests from user A and user B may be assigned to one category and access request from user C may be assigned to another category.

Figure 3:
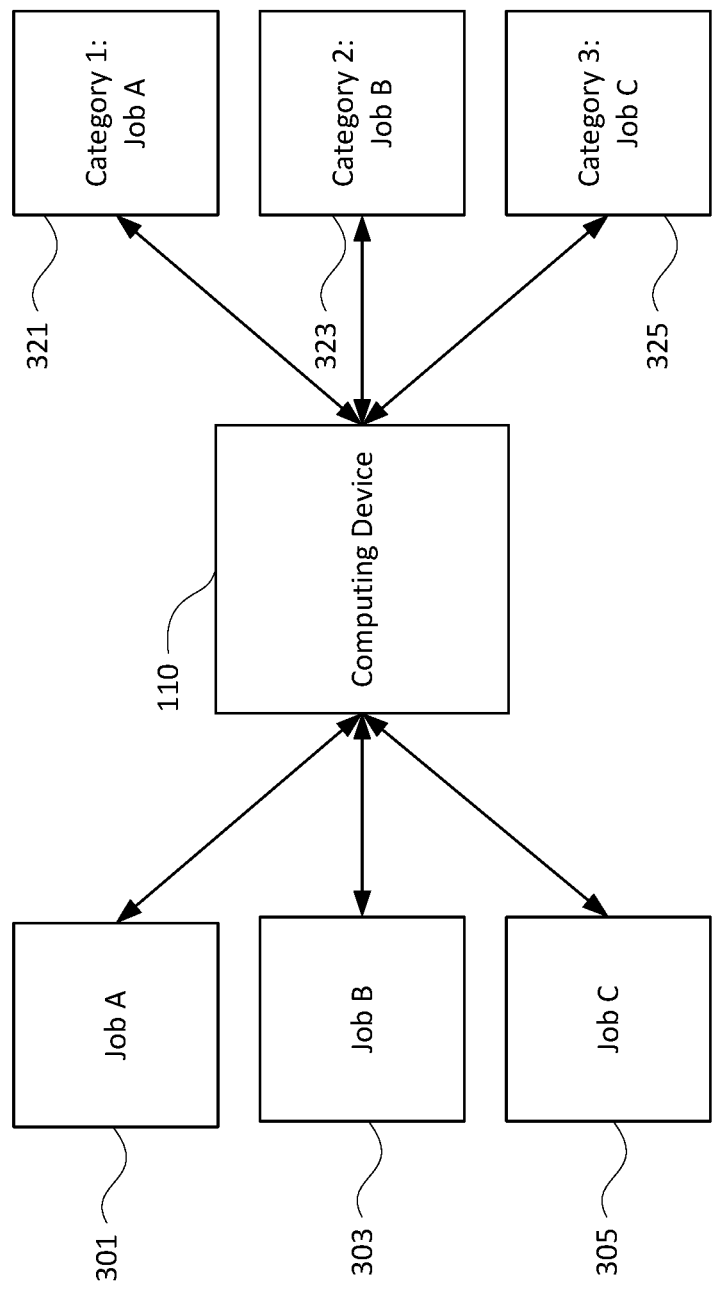
FIG. 3 is a diagram illustrating the categorization of jobs in accordance with aspects of the disclosure.

In another example, categories may correspond to different sets of jobs executed by the same user account. For instance, and as shown in FIG. 3, a user account may perform many jobs, including Job A 301, Job B 303, and Job C 305 on client computing device 110. Requests for data corresponding to each job may be categorized or otherwise assigned into respective categories. For instance, requests from the user during Job A 301 may be categorized into Category 1 321, requests from the user during Job B 303 may be categorized into Category 2 323, and requests from the user during Job C 305 may be categorized into Category 3 325. Although the foregoing example describes only three jobs—A, B, and C—any number of jobs and respective categories may be possible.

Figure 4:
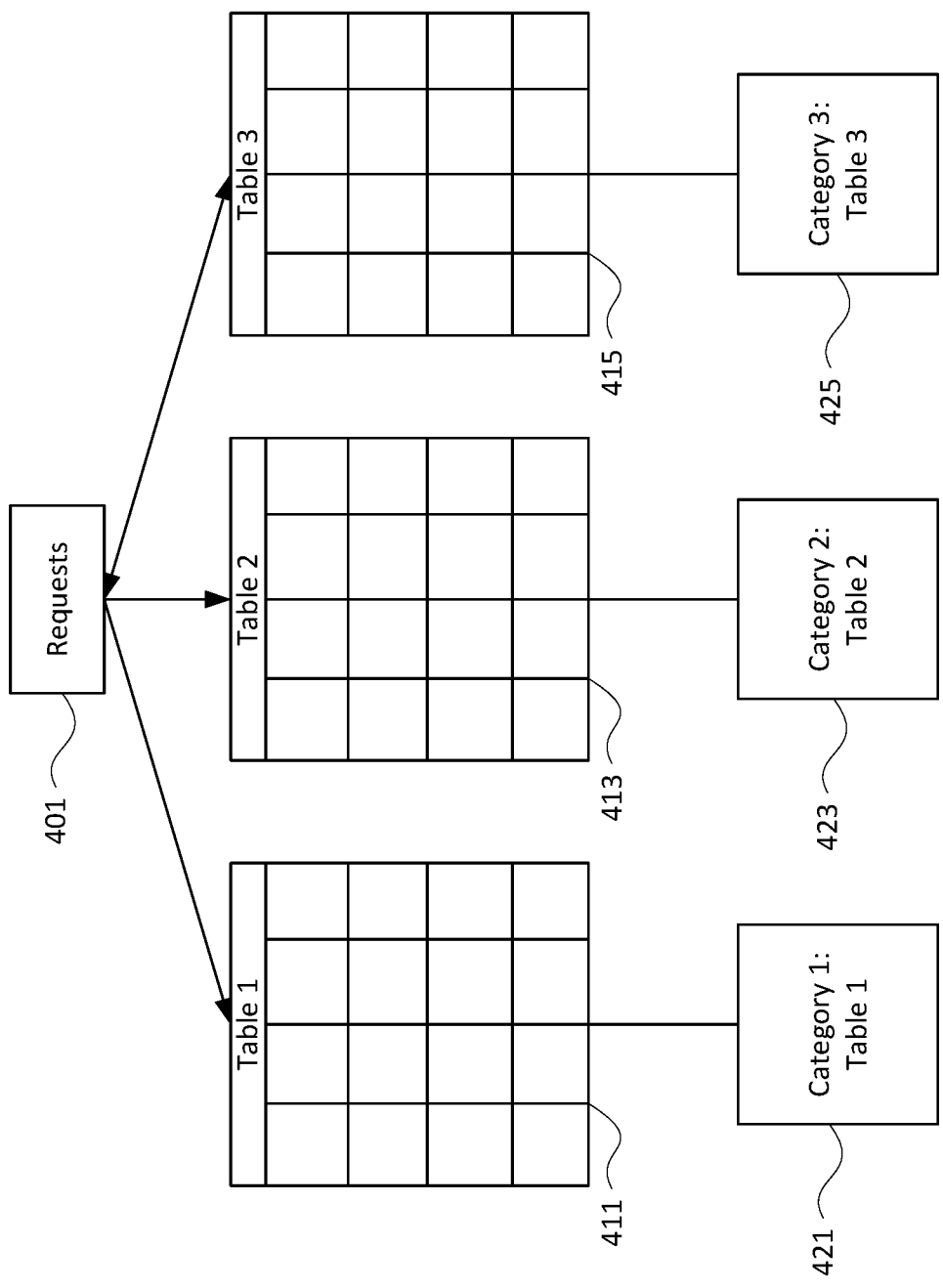
FIG. 4 is a diagram illustrating the categorization of access requests by tables in accordance with aspects of the disclosure.

As another example, the categories may be different tables in a database, thus for a distributed database with many tables, access requests from workloads of each table may be a category. For example, FIG. 4 shows three different tables, Table 1, Table 2, and Table 3. These tables may be found on a single server or data center, such as server 190, or distributed across multiple servers and/or data centers, such as across data centers 170, 180, and 190. Each request for data corresponding to a table may be categorized into a respective category. In this regard, requests for data corresponding to Table 1 411 may be categorized into Category 1 421, requests for data corresponding to Table 2 413 may be categorized into Category 2 423, and requests for data corresponding to Table 3 415 may be categorized into Category 3 425. Although the foregoing example describes three tables, Tables 1, 2, and 3 and three categories, Categories 1, 2, and 3, there may be any number of tables and any number of categories.

In yet another example, categories may be different columns in a table or different sets of columns in a table. For instance, for accesses to the same database table, access requests to different columns in the table could be assigned a first category and access requests to other columns may be assigned to a second and/or more categories. Similarly, access requests for different sets of rows and/or rows and columns may be assigned respective categories.

Information may be collected on the access requests over time, such as over a historical period of time, or over a predetermined moving window in real-time. The information collected may include any of a number of statistics and may be aggregated for each category. As examples, statistics may be collected on whether access requests have been received for data items in each category before eviction ("cache hit" v. "cache miss"), on the number of times data items from each category have been accessed before eviction, etc. In some instances, data items may be stored as blocks in cache storage, and information on access requests of the data items may be collected for each block, such as the timestamps for accesses to each block.

Where each category of data items is stored in multiple blocks, statistics for each category may be obtained by aggregating over the blocks that correspond to each category. Referring to FIG. 4, Tables 1 411, may be spread across multiple servers The information collected, including the categories the data requests were categorized, may be stored at each server or in some storage device. The information collected by each server may be retrieved, such as by a server or computing device, and aggregated together.

Utility of admitting a data item into a cache may be determined by analyzing the costs and rewards for admitting the data item. Since accessing a data item in cache storage may be faster than loading the data item from another storage location, the rewards of caching a data item depend on how frequently the data item will be accessed. For example, the more frequently a data item in the cache is accessed, the more time saving it provides, thus caching the data item generates more rewards than other data items that are being accessed less frequently. Conversely, costs of caching a data item may include costs of writing new data into flash-based cache, as there is an upper bound on the number of such writes before the flash memory becomes unusable. Other costs may include the amount of memory space occupied by the data item in the cache, processing time, etc.

In another example, items in the cache may be fetched from other data centers, so a reward may be a reduction in the network bandwidth as the cached items do not need to be retrieved over the network. In cases where network link costs are different, a "cost of bandwidth" may be used.

Utility of admitting each category of data items may thus be determined by summing the rewards of all data items in the respective category. For example, where data items are stored as blocks in the cache storage, rewards may be determined for each such block containing a plurality of data items, and then summed over the blocks within each category.

For instance, let $t_1, t_2, t_3, \ldots, t_n$ be the access times for data items in a given block, where $t_0=-\infty$, as no access may occur until $t_1$. The inter-arrival access times for the block may be determined by $d_i=t_i-t_{i-1}$, where $d_1=\infty$, as $t_1-t_0$ is infinite. A metric may be set for the inter-arrival access times $d_i$ for a given cache retention time D, which is the duration of a block staying in the cache without any access. For example, if $d_i<D$, then the block receives an access request before leaving the cache, thereby generating a cache hit, and the block may be moved to the front of the cache.

Stated another way, the inter-arrival access times to a block may be used as an approximation to determine whether the accesses will be a HIT or a MISS in the cache. By way of a simplified example, all blocks may be considered evicted from a cache. The average time these evicted blocks were in the cache since last accessed, D, may be determined. An estimate of the number of hits for a particular block may be determined by adding up all of the accesses to that block within a period less than D. The accesses to the particular block may be retrieved from the statistics described herein, where the timestamps for the accesses to that particular block are saved.

Cost metrics may also be calculated. For example, a cost metric may be used that counts the number of block accesses that are missed in the cache. For each block missed, a disk operation may be incurred. This disk operation incursion may be modeled as a cost by estimating the number of such operations. In this regard, if $d_i<D$, then we will be saving one disk operation (in other words, 1 HIT=1 disk operation saved).

In the event $d_i>D$, the block may be evicted from the cache before the next access, resulting in a cache miss and a block write to flash-based storage. In this regard, flash-based storage devices have a limit on the number of writes that can be performed before the flash-based storage device becomes unusable. Thus, minimizing the number of writes to a flash-based storage device may maximize the longevity of the flash-based storage device. Using the model above, for any access where di>D, an estimation may indicate that the block is NOT in the cache already, as all the blocks in the cache have been accessed not more than D seconds. Therefore, each such access where di>D will cause a new block to the cache to be inserted, which means that new block will be written to a flash-based storage device, and consume one of the writes from the flash-based storage device's limit. Once a block is inserted in the cache, that is written into the flash-based memory device managed by the cache, subsequent accesses that read that block from the caches will be the cache HITs. Thus, according to these classifications, $d_i>D$ may be the written bytes to flash, and block size$\times\Sigma_i$ min($d_i$, D) may be the cache byte-time used by the block.

Utility may then be determined for each category of data items using these metrics. For instance, for each category k, $HITS_k(D)$ may be the utility value for the number of disk accesses saved by the cache, $WB_k(D)$ may be the utility value for bytes written to flash, and $CBT_k(D)$ may be the utility value for cache usage for admission. Thus, where data items are stored as blocks in the cache storage, these utility values may be determined by summing the utility values over the blocks within each category.

An optimal allocation of cache may be determined by optimizing the overall utility. For instance, where $\alpha_k$ is the fraction of blocks admitted into cache in the category k, optimal allocations $\{\alpha_k\}$ may be determined by maximizing overall reward while satisfying the capacity constraint below, where $CBT_{total}$ is the utility value for the total cache size. This fractional knapsack problem may be solved, for example, using a greedy algorithm. For example, the following formulations may be solved by a greedy algorithm:

$$\Sigma_k \alpha_k \times [HITS_k(D) - WB_k(D)], \text{ such that}$$

$$\Sigma_k \alpha_k \times CBT_k(D) \leq CBT_{total}$$

Solving the above formulations, such as by using a greedy algorithm, will result in a value $\alpha_k$ for each category k, at a set retention time D. $\alpha_k$ may be range limited, such as between 0 and 1, 0 and 10, or any other range of values.

Upon determining a value $\alpha_k$ for each category k over a range of possible retention times, Ds, a determination as to which categories should be selected for inclusion in the cache may be made. For example, categories having the highest benefit cost ratio may be selected for entry into the cache. The benefit cost ratio may be determined by the following formulation:

$$(HITS_k(D) - WB_k(D))/CBT_k(D)$$

Selection of categories having the highest benefit cost ratio may be performed until the cache is full. In other words, the categories having the highest benefit cost ratio may be selected as those that can be admitted to the cache.

When receiving access requests for new pieces of data, the new piece of data may be inserted into the cache if the category associated with the access request is one of the categories selected as admissible to the cache. Pieces of data not associated with categories selected as admissible to the cache may not be inserted into the cache.

Since retention times may differ, optimization may be performed for a plurality of retention times, such as all possible retention times. Once the utility of each category of data items is determined, when access requests for new data items are received, the newly requested data may be admitted into the cache storage in an order according to the order they are received, as long as they belong to a category in which corresponding utility of their respective categories. For instance, the data items in the category with highest utility may be first admitted into the cache, then the data items in the category with second highest utility, then the data items in the category with third highest utility, and so on, until a category gives a negative reward or the cache is full.

Further in this regard, the cache admission control may be implemented as software functionality. For instance, one or more servers, such as server 190, may run cache storage, and the cache admission control may be implemented as a software layer on such servers. Alternatively, the cache admission control may be implemented as software executed by storage devices where the data is stored. As still another alternative, the cache admission control may be implemented as software on client devices of the servers. That is, regardless of where a cache is implemented, the optimization techniques described herein may be applicable—so long as accesses to data items may be assigned into categories to compute the costs and rewards of including a category of accesses in a cache.

Figure 5:
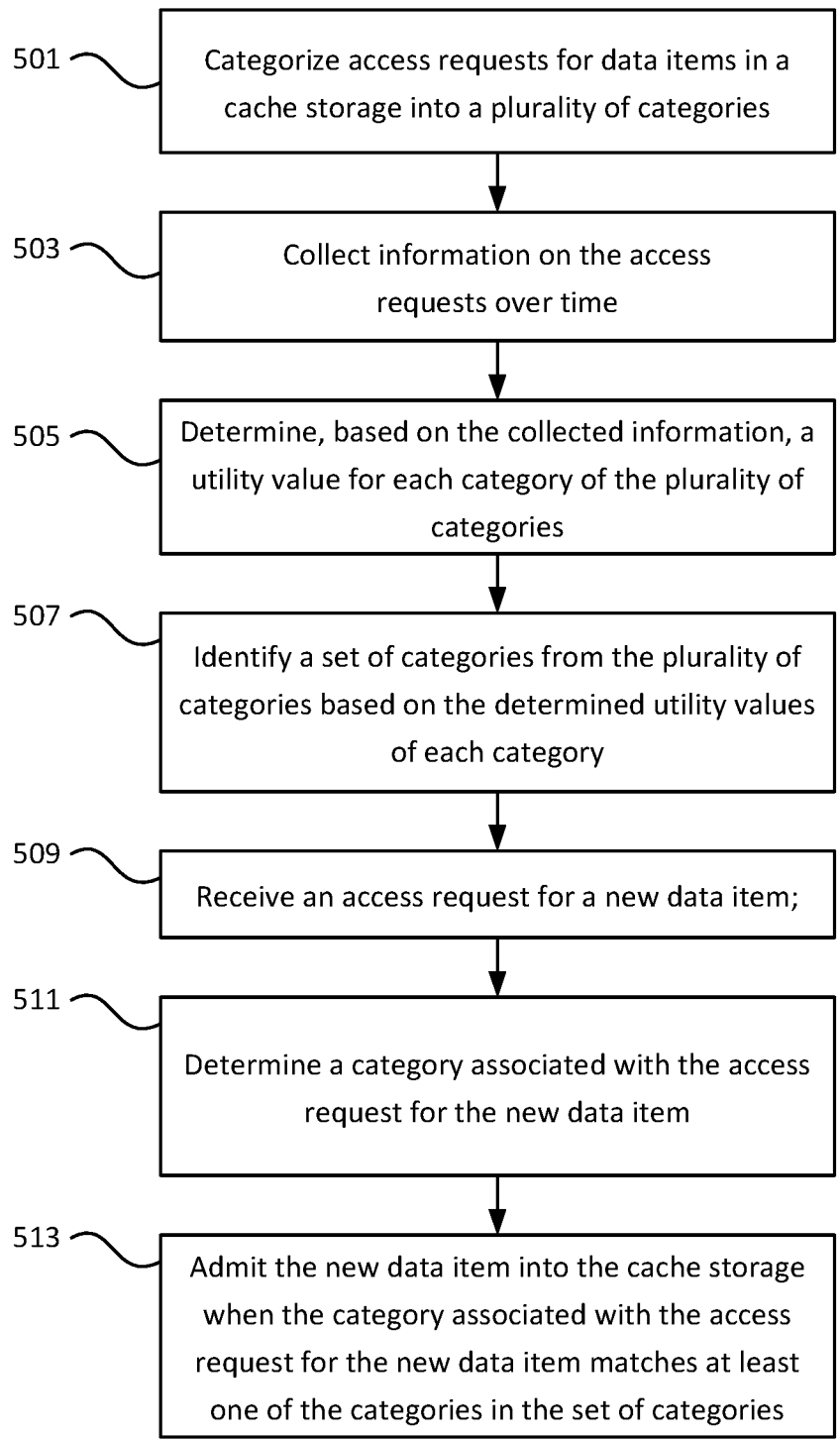
FIG. 5 is a flow diagram in accordance with aspects of the disclosure.

FIG. 5 is a flowchart 500 illustrating an example method for cache admission control. As shown in block 501, one or more processors may categorize access requests for data items in cache storage into a plurality of categories. The one or more processors may collect information on the access requests over time, as shown in block 503. Based on the collected information, a utility value for each category of the plurality of categories may be determined, as shown in block 505. The one or more processors may identify a set of categories from the plurality of categories based on the determined utility values of each category, as shown in block 507. An access for a new data item may be received, as shown in block 509 and a category associated with the access request of the new data item may be determined, as shown in block 511. The new data item may be admitted into the cache storage when the category associated with the access request for the new data item matches at least one of the categories in the set of categories, as shown in block 513.

The technology is advantageous because it provides efficient admission control for cache storage. Features of the technology allow data items that are more likely to be profitable to be cached upon first access, thereby improving data access speed for latter accesses. At the same time, the technology also avoids admitting data items that are less likely to be profitable into the cache, which reduces cost of flash write and saves space in the cache for more profitable data items. As such, the technology improves overall efficiency of cache storage.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:

categorizing, by one or more processors, access requests for data items in a cache storage into a plurality of categories, wherein the plurality of categories include one or more of user accounts, jobs, tables, or portions of tables associated with processes that generated the access requests;

collecting, by the one or more processors, information on the access requests over time;

determining, by the one or more processors based on the collected information, a utility value for each category of the plurality of categories, wherein the utility value for each category is based on at least one of a number of disk accesses saved by the access requests or a measurement of bytes written to memory as a result of the access requests;

identifying, by the one or more processors, a set of categories from the plurality of categories based on the determined utility values of each category;

receiving, by the one or more processors, an access request for a new data item;

determining, by the one or more processors, a category associated with the access request for the new data item; and admitting, by the one or more processors, the new data item into the cache storage when the category associated with the access request for the new data item matches at least one of the categories in the set of categories.

2. The method of claim 1, wherein the information is collected over a historical time period.

3. The method of claim 1, wherein the information is collected in real-time over a predetermined moving window.

4. The method of claim 1, wherein the information collected may include at least one of: whether access requests have been received for data items in each category before eviction or a number of times data items from each category has been accessed before eviction.

5. The method of claim 1, wherein data items are stored as blocks in the cache storage and the information on access requests are collected for each block.

6. The method of claim 5, wherein data items in each category is stored in multiple blocks, and the utility value for each category is determined by summing respective utility values of the multiple blocks.

7. The method of claim 1, wherein the utility value is determined by one or more of: disk access time savings, written bytes to flash, and cache byte-time used.

8. The method of claim 1, wherein the utility value is determined over a plurality of cache retention times.

9. The method of claim 1, wherein newly requested data items are admitted into the cache storage in a descending order according to their respective utility value until the cache storage is full or when a next category provides a negative utility value.

10. A system, comprising:

one or more processors configured to:

categorize access requests for data items in cache storage into a plurality of categories, wherein the plurality of categories include one or more of user accounts, jobs, tables, or portions of tables associated with processes that generated the access requests;

collect information on the access requests over time;

determine, based on the collected information, a utility value for each category of the plurality of categories, wherein the utility value for each category is based on at least one of a number of disk accesses saved by the access requests or a measurement of bytes written to memory as a result of the access requests;

identify a set of categories from the plurality of categories based on the determined utility values of each category;

receive an access request for a new data item;

determine a category associated with the access request for the new data item; and admit the new data item into the cache storage when the category associated with the access request for the new data item matches at least one of the categories in the set of categories.

11. The system of claim 10, wherein the one or more processors are on the storage devices.

12. The system of claim 10, further comprising:

one or more client devices configured to access the data items in the cache storage.

13. The system of claim 12, wherein the one or more processors are on the client devices.

14. A non-transitory computer-readable storage medium storing instructions executable by one or more processors for performing a method, comprising:

categorizing access requests for data items in a cache storage into a plurality of categories, wherein the plurality of categories include one or more of user accounts, jobs, tables, or portions of tables associated with processes that generated the access requests;

collecting information on the access requests over time;

determining, based on the collected information, a utility value for each category of the plurality of categories, wherein the utility value for each category is based on at least one of a number of disk accesses saved by the access requests or a measurement of bytes written to memory as a result of the access requests;

identifying a set of categories from the plurality of categories based on the determined utility values of each category;

receiving an access request for a new data item;

determining a category associated with the access request for the new data item; and admitting the new data item into the cache storage when the category associated with the access request for the new data item matches at least one of the categories in the set of categories.

15. The non-transitory computer-readable storage medium of claim 14, wherein the information is collected over a historical time period.

16. The non-transitory computer-readable storage medium of claim 14, wherein the information is collected in real-time over a predetermined moving window.

17. The non-transitory computer-readable storage medium of claim 14, wherein the information collected may include at least one of: whether access requests have been received for data items in each category before eviction or a number of times data items from each category has been accessed before eviction.

* * * * *